US011345060B2

(12) United States Patent
Ursella et al.

(10) Patent No.: US 11,345,060 B2
(45) Date of Patent: May 31, 2022

(54) METHOD AND APPARATUS FOR FORMING COMPACTED POWDER PRODUCTS

(71) Applicant: SACMI COOPERATIVA MECCANICI IMOLA SOCIETA' COOPERATIVA, Imola (IT)

(72) Inventors: Enrico Ursella, Mestre (IT); Konrad Tschurtschenthaler, Castelrotto (IT); Domenico Bambi, Budrio (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 744 days.

(21) Appl. No.: 16/333,295

(22) PCT Filed: Sep. 14, 2017

(86) PCT No.: PCT/IB2017/055550
§ 371 (c)(1),
(2) Date: Mar. 14, 2019

(87) PCT Pub. No.: WO2018/051257
PCT Pub. Date: Mar. 22, 2018

(65) Prior Publication Data
US 2019/0240864 A1 Aug. 8, 2019

(30) Foreign Application Priority Data

Sep. 16, 2016 (IT) .................. 102016000093579

(51) Int. Cl.
*G01B 15/02* (2006.01)
*B28B 17/00* (2006.01)
(Continued)

(52) U.S. Cl.
CPC .......... *B28B 17/0081* (2013.01); *B28B 3/123* (2013.01); *B28B 17/0036* (2013.01);
(Continued)

(58) Field of Classification Search
CPC . B28B 17/0081; B28B 3/123; B28B 17/0036; G01N 9/24; G01N 23/083; G01N 23/12; G01N 2223/633; G01N 2223/643
See application file for complete search history.

(56) References Cited

U.S. PATENT DOCUMENTS 2,723,350 A * 11/1955 Clapp .................. G01N 23/083
250/214 R
2,983,819 A 5/1961 Bigelow et al.
(Continued)

FOREIGN PATENT DOCUMENTS

CN 101111759 A 1/2008
CN 101378885 A 3/2009
(Continued)

OTHER PUBLICATIONS

EPO Communication pursuant to Rule 114(2) EPC dated Apr. 21, 2021, concerning third party observations filed against European patent application No. 17781188,2.
(Continued)

*Primary Examiner* — Kiho Kim
(74) *Attorney, Agent, or Firm* — The Dobrusin Law Firm, P.C.

(57) ABSTRACT

An apparatus for forming compacted powder products. The apparatus includes a powder supply system and a compacting station. An emitter emits an input X-ray beam having a predetermined emission intensity. An output detector detects an output parameter representing an output intensity of the X-ray beam which passes through the powders. A reference detector detects a reference parameter representing the effective intensity of the X-ray beam generated. A control unit is programmed to compensate the output parameter by means of the reference parameter and to generate a control
(Continued)

signal representing the density detected and to control the powder supply system by means of the control signal.

19 Claims, 1 Drawing Sheet

(51) Int. Cl.
*G01N 23/12* (2018.01)
*G01N 9/24* (2006.01)
*B28B 3/12* (2006.01)
*G01N 23/083* (2018.01)

(52) U.S. Cl.
CPC ............ *G01N 9/24* (2013.01); *G01N 23/083* (2013.01); *G01N 23/12* (2013.01); *G01N 2223/633* (2013.01); *G01N 2223/643* (2013.01)

(56) References Cited

U.S. PATENT DOCUMENTS

| | | | |
|---|---|---|---|
| 4,727,561 A | 2/1988 | Fujisaki | |
| 2008/0253532 A1 | 10/2008 | Hess et al. | |
| 2009/0207972 A1 | 8/2009 | Sato | |
| 2011/0147603 A1 | 6/2011 | Ichizawa et al. | |
| 2012/0221275 A1 | 8/2012 | Obinata et al. | |
| 2015/0224576 A1 | 8/2015 | Lampenscherf et al. | |

FOREIGN PATENT DOCUMENTS

| | | |
|---|---|---|
| CN | 100563962 A | 12/2009 |
| CN | 102837837 A | 12/2012 |
| CN | 103874564 A | 6/2014 |
| CN | 104736274 A | 6/2015 |
| DE | 9307248 U1 | 7/1993 |
| DE | 29706476 U1 | 3/1998 |
| DE | 102006030122 A1 | 1/2008 |
| DE | 102006059564 A1 | 6/2008 |
| DE | 102012019757 A1 | 4/2014 |
| EP | 1641607 B1 | 8/2008 |
| EP | 2251669 A2 | 11/2010 |
| EP | 2763827 B1 | 8/2014 |
| EP | 2763845 B1 | 8/2014 |
| EP | 3099478 A1 | 12/2016 |
| JP | H03-162646 A | 7/1991 |
| JP | H03162646 A | 7/1991 |
| JP | H10-227734 A | 8/1998 |
| JP | H11142352 A | 5/1999 |
| JP | 2004108871 A * | 4/2004 |
| RU | 2025055 C1 | 12/1994 |
| RU | 2385802 C2 | 4/2010 |
| RU | 2397623 C2 | 8/2010 |
| RU | 2487798 C2 | 7/2013 |
| WO | 2005/005115 A1 | 1/2005 |
| WO | 2006/018463 A1 | 2/2006 |
| WO | 2007/093481 A1 | 8/2007 |
| WO | 2015/114433 A1 | 8/2015 |

OTHER PUBLICATIONS

European Intention to Grant, from European Application No. 17 781 188.2-1001, dated Nov. 19, 2021.
Second Office Action. dated Aug. 3, 2021, for Chinese Patent Application No. 201780057142.3.
International Search Report and Written Opinion for International Application No. PCT/IB2017/055550; dated Nov. 15, 2017.

* cited by examiner

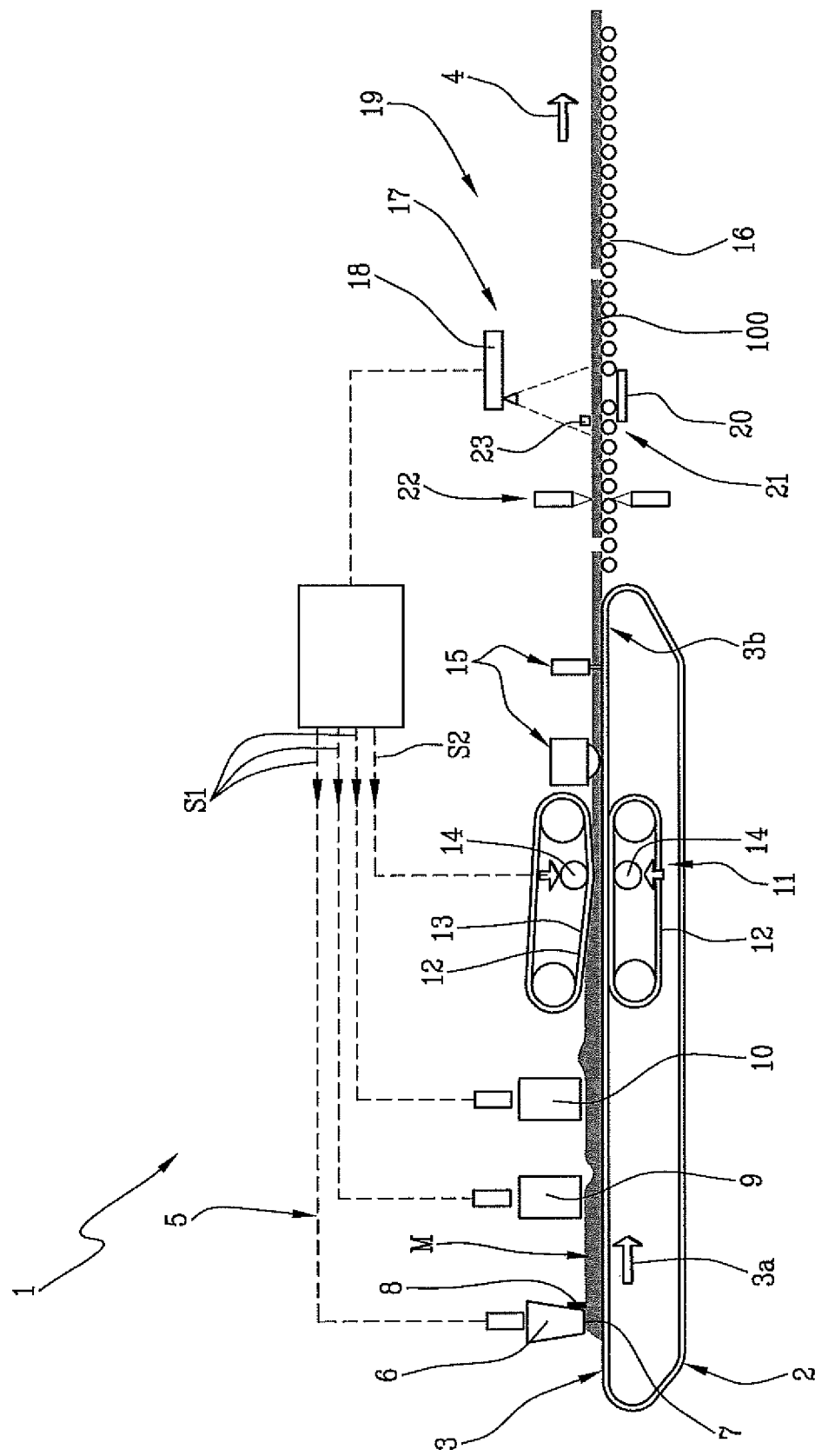

METHOD AND APPARATUS FOR FORMING COMPACTED POWDER PRODUCTS

TECHNICAL FIELD

This invention relates to a method and an apparatus for forming compacted powder products.

In particular, this description is directed to the sector of ceramic tiles and, more specifically, to a method and an apparatus for forming ceramic tiles.

BACKGROUND ART

In the technology of ceramic tile manufacture by compaction or pressing of semi-dry powders (that is, powders having a moisture content of between 5 and 6%), a fundamental parameter to be kept under control during the production process is the density of the powders, especially the density of the product after pressing. This parameter indicates the densification of the powders, in particular of the ceramic particles, and determines the subsequent behaviour of the product during firing. In effect, the more uniform the density is, the less the product will be subject to warping during subsequent processes, in particular during firing in the case of ceramic products. Further, to guarantee the reproducibility of production, the density must remain stable for an entire production batch in order to avoid differences of shrinkage (normally 7-8%) causing the end product to be rejected (on account of dimensional non-conformity).

The method usually adopted to measure the density, especially in the ceramic sector, involves weighing a small sized sample using a mercury immersion weighing system. The density of the sample can be found by indirectly calculating its volume, knowing its mass.

This measuring method makes it possible to measure the density of the sample with a very high degree of precision (±0.1%). This precision is necessary for correctly regulating the process, which requires a maximum density variation of ±1% in order to obtain a constant industrial production.

Measuring with a mercury balance, however, has some drawbacks. In effect, it is a destructive measuring process in that the sample measured is taken from an article which is then rejected. Also, it is a laborious process which requires a certain amount of skill and whose results tend to differ according to the operator using it. Moreover, the use of mercury is potentially dangerous for human health and the necessary precautions must therefore be taken.

If the precision with which density is measured is important in the case of reciprocating presses, it is fundamental in the case of continuous compacting lines on account of the different compacting method.

A continuous compacting line is described, for example, in EP2763827B1 which is incorporated herein by reference. A lower conveyor belt receives and feeds a soft charge which is gradually densified by a converging upper belt and finally compacted by two pressing rollers under the action of pressing cylinders. The result of the continuous pressing action is a compacted powder product which is subsequently processed and made into a series of slabs of desired size. The slabs are then dried, decorated and fired to obtain the end product.

The densifying method is clearly different from that used in reciprocating presses and it is difficult to assess the area on which the pressing force applied by the pressing rollers is distributed. In particular, the material is densified gradually (in the direction of feed) and the effectiveness of compaction is influenced by several factors (internal friction of the material, surface cohesion, mix moisture, etc.).

As a result, in a continuous compacting line, unlike reciprocating presses, maintaining the compaction density of the slab fed out cannot be correlated with physical adjustment parameters of the machinery. For example, a variation in the thickness of the material fed in leads to a variation in both thickness and density of the product fed out.

Known in the prior art, for example from EP1641607B1, are thickness control systems for continuous compacting lines where position transducers at the slab outfeed zone measure the thickness and provide feedback signals acting on the powder feed system.

The Applicant has found that this control system keeps product thickness constant but has only a marginal effect on the density of the material compacted, in particular in those cases where density varies in a direction transverse to the feed direction.

The Applicant has also found that the mercury immersion method is not applicable to continuous compacting lines because, in addition to the drawbacks mentioned above, it would appear to introduce discontinuity with negative effects on productivity.

It is known from JPH03162646 or WO2006/018463 that a product can be tested using an X-ray beam which is partially absorbed by the product itself. The X-ray beam emerges from the underside surface in the form of an output beam and is received by a detector.

Processing the X-ray absorption signal and taking into account the thickness measured provides an information item correlated with the density of the material, by applying the Lambert Beer law.

The Applicant, however, has found that the high voltage generators used to supply the X-ray emitting tubes suffer from fluctuations in the voltage produced. These fluctuations may be either periodical and low in frequency (50 Hz-10 kHz) or with much slower variations, in the order of minutes or hours. In the case of measuring systems based on X-rays, these fluctuations have a direct influence on the power and spectrum of the X-rays emitted and, consequently, on those received by the detector of JPH03162646 or WO2006/018463. Where an extremely accurate measurement of the absorption by the test material is necessary, as in the case of ceramics, this phenomenon may seriously disturb the measurement. Indeed, a variation of 1% in the voltage applied to the tube produces a variation of approximately the same entity in the signal detected.

DISCLOSURE OF THE INVENTION

This disclosure has for an aim to provide a method and an apparatus for forming compacted powder products to overcome the above mentioned disadvantages of the prior art.

More specifically, the aim of this disclosure is to provide a method and an apparatus for forming compacted powder products capable of making to products whose density is characterized by a high level of uniformity not only within an individual product but also in the context of the entire production batch.

These aims are fully achieved by the method forming the object of this disclosure and as characterized in the appended claims.

It should be noted that the term "powders" is used in this document to mean any material in the form of small parts such as, for example, grains, flakes or chips. These powders may be of different materials: for example, ceramic or wood or other materials (plastic or metal).

In particular, an input X-ray beam of predetermined emission intensity is generated on one side of the powders and an output parameter representing an output intensity of the X-ray beam which passes through the powders is detected on a second side of the powders, opposite the first side. A reference parameter representing the effective intensity of the X-ray beam generated is also detected on the first side of the powders. The density of the powders is then determined by compensating the output parameter using the reference parameter. A control signal representing the detected density is then generated. In one embodiment, the method comprises controlling the step of depositing the soft powder mass using (that is, as a function of) the control signal. In one embodiment, the method comprises controlling the step of compacting the soft powder mass (in addition or alternatively to controlling the step of depositing the soft powder mass) using (that is, as a function of) the control signal.

Preferably, the compensating step is performed by normalizing the output parameter to obtain a compensated parameter given by the ratio between the output parameter and the reference parameter.

Preferably, the compensating step is performed by applying an algorithm which operates as a function of the effective hardness of the input X-ray beam determined as a function of the reference parameter.

Preferably, the method comprises a calibrating step in which a plurality of reference parameters and output parameters operating on a plurality of powders of known density are stored.

Preferably, there is a step of operating on the compacted powder product. Preferably, the method comprises controlling the step of compacting the soft powder mass using the control signal.

Preferably, the method comprises continuously depositing the soft powder mass on a supporting table which is slidable in a feed direction, in such a way as to form a continuous strip of powders and to advance the supporting table through a compacting station operating continuously in order to compact the powders as the supporting table advances in such a way as to obtain the compacted powder product in the form of a continuous belt by means of a sliding compacting surface.

Alternatively, the method comprises depositing a quantity of soft powder mass and compacting it using a reciprocating press.

Preferably, some actions are repeated at two or more points to determine a powder density profile.

Preferably, the method for forming compacted powder products is used in a method for forming ceramic tiles.

These aims are also fully achieved by the apparatus forming the object of this disclosure as characterized in the appended claims.

In particular, an emitter located on one side of the powders emits an input X-ray beam of predetermined emission intensity and an output detector located on a second side of the powders, opposite the first side detects an output parameter representing an output intensity of the X-ray beam which passes through the powders. A reference detector located on a first side detects a reference parameter representing the effective intensity of the X-ray beam generated. A control unit compensates the output parameter by means of the reference parameter, generates a control signal representing the density detected and control a powder supply system. Preferably, the reference detector is located at a position not screened from the input X-ray beam and offset relative to the output detector. Preferably, the control unit is programmed to perform compensation by normalizing the output parameter to obtain a compensated parameter given by the ratio between the output parameter and the reference parameter.

Preferably, the control unit is programmed to perform compensation by applying an algorithm which operates as a function of the effective hardness of the input X-ray beam determined as a function of the reference parameter.

Preferably, the emitter is positioned in such a way as to operate on the compacted powder product.

Preferably, the powder supply system is configured to operate continuously on a supporting table which is slidable in a feed direction, in such a way as to form a continuous strip of powders. The compacting station comprises a sliding compacting surface to compact the powders as the supporting table advances in such a way as to obtain the compacted powder product in the form of a continuous belt.

Preferably, the emitter, the output detector and, when necessary, the reference detector are movable in a direction transverse to the feed direction to determine a powder density profile.

Preferably, the compacting station comprises a reciprocating press operating on a quantity of soft powder mass.

Preferably, the apparatus for forming compacted powder products is used in an apparatus for forming ceramic tiles.

According to another aspect of this description, a device for measuring the density of an object is provided. This device may, in particular, be a transparency densitometer.

In at least one embodiment (for example, the one illustrated) the device is for (that is to say, is designed to be applied in the context of) an apparatus for forming products by powder compaction.

In other possible embodiments, the device is designed to measure the density of objects of any type. In one embodiment, the device is designed to measure the density of solid objects such as, for example, wooden boards or planks, or objects made by 3D printing.

In one embodiment, the device is integrated in a line (or a machine) for the (continuous) production or processing of solid objects; in particular, the device is configured to measure the density of an object in transit through a line (or a machine) or of single objects (in their final version or in an initial version or intermediate version, corresponding to a semi-finished product) in transit through the line (or the machine).

The line (or the machine or the device itself) might also include a control unit configured to receive a control signal representing the density detected. Preferably, the control unit is programmed to vary one or more process parameters (which influence the operation of the line or parts thereof) as a function of the control signal.

The device comprises:
an emitter located on a first side of an object to be measured, where the emitter is configured to emit a light beam of predetermined emission intensity;
an output detector located on a second side of the object to be measured, opposite the first side, where the detector is configured to detect an output parameter representing an output intensity of the light beam which passes through the object;
a measuring device configured to measure the thickness of the object;
a control unit operatively connected to the emitter, the output detector and the measuring device.

The control unit is programmed to determine the density of the object as a function of the emission intensity, the output intensity, the thickness of the object and the type of material the object is made of.

It should be noted that in one embodiment, this control unit may be a device control unit which is dedicated to measuring the density of the objects and which may be physically contained in the device.

In another possible embodiment, the control unit is built into a line or machine control unit which also has the function of controlling (wholly or partly) the operation of the line or of one or more machines in the line, or the operation of the machine or of one or more parts of the machine.

The device also includes a reference detector located on the first side and configured to detect a reference parameter representing the effective intensity of the light beam generated.

The control unit is operatively connected to the reference detector and is programmed to compensate the output parameter by means of the reference parameter and to generate a control signal representing the density detected.

In at least one possible embodiment, the control unit is also programmed to control (by means of feedback), using the control signal, one or more process parameters of the line or of a machine for the production or processing of the object measured.

In one embodiment, the light beam is an X-ray beam; in that case, the emitter is configured to emit an X-ray beam. Alternatively, the light beam might differ from X-rays in frequency, compatibly with a possible requirement that the object be transparent to the light emitted.

This description also provides a method for measuring the density of an object. More specifically, this description also provides a method for measuring the density of an object by means of transparency densitometry.

This method may be used in a process for the production or processing of objects (or products), preferably for controlling the process itself as a function of the density measurement.

This method comprises the following steps:
generating on a first side of the object an input beam of light (preferably X-rays) having a certain (or predetermined or preset) emission intensity;
detecting on a second side of the object, opposite the first side, an output parameter representing an output intensity of the light beam which passes through the object;
measuring the thickness of the object and determining its density as a function of the emission intensity, the output intensity, and the thickness of the object;
detecting on the first side of the object a reference parameter representing the effective intensity of the light beam generated;
compensating the output parameter using the reference parameter to determine the density of the powders;
generating a control signal representing the detected density.

In a possible embodiment, the method also comprises controlling (in at least one of its operating steps) the process for the production or processing of the object whose density is being measured.

For example, in one embodiment, where the process is a process (or method) for forming compacted powder products (through a step of depositing the powders, followed by a step of compacting the powders), at least the step of depositing the soft powder mass is controlled by means of the control signal.

The device and the method for measuring the density of an object may include one or more of the features (for example, relating to the compensation of the measurement) which, in this description, are described with specific reference to a method or apparatus for the production of products by powder compaction; in effect, this application (to the production of products by powder compaction) is not intended as limiting the description of the device and method for measuring the density of an object.

BRIEF DESCRIPTION OF THE DRAWING

These and other features of the disclosure will become more apparent from the following detailed description of a preferred, non-limiting example embodiment of it illustrated in the single accompanying drawing which shows a schematic side view of an apparatus for forming compacted powder products.

DETAILED DESCRIPTION OF PREFERRED EMBODIMENTS OF THE INVENTION

With reference to the accompanying drawing, the numeral 1 denotes in its entirety an apparatus for forming compacted powder products 100.

More specifically, the apparatus 1 illustrated in the drawing defines a continuous compacting line comprising a conveyor belt 2 defining with its upper active portion a slidable supporting table 3.

The supporting table 3 is mounted horizontally and extends at least from an input portion 3a on which a soft powder mass "M" is deposited and an output portion 3b from which the products 100 are moved away.

The conveyor belt 2 is motor-driven in such a way as to move the supporting table 3 in a feed direction 4 corresponding to a longitudinal direction of the apparatus.

The mass "M" is deposited on the supporting table 3 by means of a powder supply system 5. In the embodiment illustrated, the powder supply system is configured to operate continuously on a supporting table 3 which is slidable in the feed direction 4, in such a way as to form a continuous strip of powders.

In a possible embodiment, of which the accompanying drawing constitutes a non-limiting example, the powder supply system 5 comprises a dispensing device 6 provided with a dispensing mouth 7 configured to create a loading profile which is variable both in the feed direction 4 and in a direction transverse to the feed direction 4 in the horizontal plane of the conveyor belt.

The dispensing mouth 7 may, for example, be embodied according to what is described and illustrated in EP2050549, incorporated herein by reference, comprising a barrier 8 provided with a shaped levelling profile made preferably of compliant elastomer. The barrier may be shaped according to requirements and fixed in the new configuration by operating manually on tightening screws or on suitable automatic systems (for example, electronically controlled hydraulic actuators).

In a possible embodiment, the dispensing mouth 7 is configured to skim the mass "M" in such a way as to obtain a constant level. For example, electromechanical or pneumatic actuators can be driven to adjust the dispensing mouth 7, in particular the barrier 8.

In addition or alternatively, the loading profile may be controlled, through algorithms and drive systems, by a series of digital actuators not illustrated (for example, electrovalves, pistons, gate valves, etc.).

In addition or alternatively, the powder supply system 5 comprises a selective removal device 9 and/or an accumulating device 10.

The selective removal device 9 is configured to locally reduce quantities of powder (for example, by means of suction nozzles) and may be made, for example, as described and illustrated in EP1594666B1, which is incorporated herein by reference, where one suction nozzle operates uniformly on the full loading width and performs selective reduction by means of dividers, such as actuator-driven gate valves.

The accumulating device 10 is configured to locally deliver small additional quantities of soft powder. An example of an accumulation device is described and illustrated in WO2009/118611A1, which is incorporated herein by reference, comprising a container hopper, a distribution element and vibrator means configured to set the distribution element in vibration. The soft mass "M", suitably modulated in height (both transversely and longitudinally) is made to advance up to a compacting station 11 configured to receive the soft mass "M" and to compact it against the supporting table 3 to obtain the product 100.

In one embodiment, as for example illustrated in the accompanying drawing, the apparatus 1 comprises a continuous compacting station 11 comprising converging belts 12 defining a sliding compacting surface 13 which is flexible and placed over the supporting table 3. The sliding compacting surface 13 slides in the same direction as the feed direction 4 of the supporting table 3. Also provided are pressing rollers 14 configured to press the compacting surface 13 towards the supporting table in such a way as to press the soft mass "M" which is interposed between them.

The sliding compacting surface 13 continuously compacts the powders as the supporting table 3 advances in such a way as to obtain the compacted powder product 100 in the form of a continuous belt.

The compacted product in the form of a continuous belt feeding out of the compacting station 11 is cut and trimmed by cutting devices 15. The products are carried on rollers 16 moving in the feed direction 4 towards further processing stages of the production cycle (drying, decorating, firing, cutting to size and surface finishing).

Downstream of the compacting station 11, the products 100 meet an inspection and measuring system 17 configured to measure the density of the material non-destructively.

The inspection and measuring system 17 comprises an emitter 18 mounted on a first side 19 of the powders (more specifically, of the product 100) and configured to emit an input X-ray beam having a predetermined emission intensity $I_0$.

The inspection and measuring system 17 comprises an output detector 20 mounted on a second side 21 of the powders, opposite the first side 19, and configured to detect an output parameter representing an output intensity $I_1$ of the X-ray beam which passes through the powders.

The inspection and measuring system 17 comprises a measuring device 22 configured to measure the thickness of the powders and, more specifically, of the product 100.

The inspection and measuring system 17 comprises a reference detector 23 mounted on the first side 19 and configured to detect a reference parameter representing the effective intensity $I_2$ of the X-ray beam generated.

Preferably, the reference detector 23 is located at a position not screened from the input X-ray beam and offset relative to the output detector 20.

A control unit 24 is operatively connected to the emitter 18, the output detector 20, the measuring device 22 and the reference detector 23 and is to programmed to determine the density of the powders as a function of the emission intensity $I_0$, the output intensity $I_1$, and the thickness and type of the powders.

More specifically, the control unit 24 processes signals from the emitter 18, from the output detector 20 and from the reference detector 23 to generate an X-ray absorption signal. The control unit 24 also processes a signal from the measuring device 22 and, taking into account the thickness measured, determines the density of the material by applying the Lambert-Beer law.

Further, in determining the density of the material, the control unit 24 is programmed to compensate the output parameter by means of the reference parameter.

Moreover, the control unit 24 is programmed to generate a control signal "S1" representing the density detected.

The control unit 24 is connected to the powder supply system 5 to control it as a function of the control signal S1.

In one embodiment, the control unit 24 is connected to the compacting station to control it as a function of the control signal S1 (in addition or alternatively to controlling the powder supply system 5).

The control of the supply system consequently modifies the loading profile of the soft mass "M". For example, the dispensing device 6 comprises a dispensing mouth 7 whose shape can be modified as a function of the control signal "S1". In particular, electromechanical or pneumatic actuators can be driven as a function of the control signal "S1" to modify the barrier 8. The control signal "S1" may also be used to control the selective removal device 9 and/or the accumulating device 10.

Optionally, the control unit 24 is programmed to generate a control signal "S2" representing the density detected and to control the compacting station 11, in particular the pressing rollers 14, by means of the control signal "S2".

Advantageously, the emitter 18, the output detector 20 and, if necessary, the reference detector 23, may be mounted on units which are movable on guides extending transversely to the feed direction 4, and which are controlled by the control unit 24 which controls their movement in such a way as to determine a density profile transversely to the product 100.

Advantageously, each point of the profile is given by the average of a plurality of closely consecutive readings taken in a predetermined length of time (e.g., 1 sec). That way, it is possible to measure products whose top surface is irregular (textured).

During the production of products, in particular ceramic slabs, the inspection and measuring system 17 continuously monitors the density of the material, preferably by accumulating information in the form of density profiles. This information is then sent by way of the control signal "S1" to the powder supply system 5 upstream of the compacting station, which adjusts the loading profile accordingly, and if necessary, by way of the control signal "S2" to the compacting station 11.

Thanks to the reference detector 23, it is possible to automatically compensate any fluctuations of intensity and/or hardness of the X-ray beam. The reference detector 23 is irradiated by the same source, that is, by the emitter 18, and is located at a point where it is not screened. Thus, the time variations measured with the reference detector 23 are those attributed to the fluctuations of the X-ray beam emitted and may thus be compensated.

Compensation may occur at different levels. For example, the control unit 24 may be programmed to perform compensation by normalizing the output parameter to obtain a compensated parameter given by the ratio between the output parameter and the reference parameter. Alternatively, the control unit 24 may be programmed to perform compensation by applying an algorithm which operates as a function of the effective hardness of the input X-ray beam determined as a function of the reference parameter.

The apparatus described above allows the density to be measured to continuously and in real time, making it possible to obtain a density profile and feedback control of the powder supply system and, if necessary, of the compacting station.

The foregoing can also be applied to a traditional forming apparatus operating with reciprocating presses, where feedback may operate on the loading systems and/or on the devices for metering the additional powders. In this case, operation is discontinuous and involves depositing a quantity of soft powder mass and compacting it with a reciprocating press.

In both cases, alternatively to what is described, the inspection and measuring system 17 may be located upstream of the compacting station and configured to measure non-destructively the density of the soft mass "M".

In both cases, the apparatus in use operates using a method for forming compacted powder products wherein a soft powder mass "M" is deposited on a supporting table and delivered to a continuous compacting station or to reciprocating presses.

The soft mass "M" is compacted against the supporting table 3 to obtain the compacted powder product. Before, or preferably after compaction and hence with reference to the compacted powder product, an input X-ray beam having a predetermined emission intensity $I_0$ is generated on the first side of the powders. The beam passes through the mass, in particular through the product, making it possible to detect, on a second side of the powders, opposite the first side, an output parameter representing an output intensity $I_1$ of the X-ray beam which passes through the powders. Also, the thickness of the powders is measured and the density thereof is determined as a function of the emission intensity, the output intensity, and the thickness of the powders by applying the Lambert-Beer law.

By detecting on the first side of the powders, a reference parameter representing the effective intensity $I_2$ of the X-ray beam generated, it is possible to compensate the output parameter using the reference parameter to determine the density of the powders.

The actions described above can be repeated at two or more points to determine a powder density profile.

Lastly, a control signal "S1" and/or "S2" representing the detected density is then generated in order to control the step of depositing the soft powder mass using the control signal "S1" and, if necessary, the step of compacting the soft powder mass using the control signal "S2".

The method may also comprise a calibrating step in which a plurality of reference parameters and output parameters operating on a plurality of powders of known density are stored.

Both the method and the apparatus described above refer both to powder compaction in general and to its specific application in the sector of ceramic tiles in the context of a method and an apparatus for forming ceramic tiles.

The invention claimed is:

1. A method for forming compacted powder products, comprising the steps of:
   a) depositing a soft powder mass on a supporting table and delivering the soft powder mass to a compacting station;
   b) compacting the soft powder mass against the supporting table to obtain the compacted powder product;
   c) generating on a first side of the powders an input X-ray beam having a predetermined emission intensity;
   d) detecting, on a second side of the powders, opposite the first side, an output parameter representing an output intensity of the X-ray beam, which passes through the powders;
   e) measuring a thickness of the powders and determining a density thereof as a function of the emission intensity, the output intensity, and the thickness and type of the powders,
   f) detecting on the first side the powders a reference parameter representing an effective intensity of the X-ray beam generated;
   g) compensating the output parameter using the reference parameter to determine the density of the powders; and
   h) generating a control signal representing a detected density and controlling the step of depositing the soft powder mass using the control signal.

2. The method according to claim 1, wherein the compensating step g) is performed by normalizing the output parameter to obtain a compensated parameter given by a ratio between the output parameter and the reference parameter.

3. The method according to claim 1, wherein the compensating step g) is performed by applying an algorithm which operates as a function of the effective hardness of the input X-ray beam determined as a function of the reference parameter.

4. The method according to claim 1, comprising a calibrating step in which a plurality of reference parameters and output parameters performing steps c)-f) on a plurality of powders of known density are stored.

5. The method according to claim 1, wherein steps c)-f) are performed on the compacted powder product.

6. The method according to claim 5, comprising controlling the step of compacting the soft powder mass using the control signal.

7. The method according to claim 1, wherein steps a) and b) are performed continuously and comprise:
   continuously depositing the soft powder mass on the supporting table which is slidable in a feed direction, in such a way as to form a continuous strip of powders,
   feeding the supporting table through a compacting station operating continuously to compact the powders as the supporting table advances in such a way as to obtain the compacted powder product in the form of a continuous belt by means of a sliding compacting surface.

8. The method according to claim 1, wherein steps a) and b) are performed discontinuously and comprise:
   depositing a quantity of soft powder mass and compacting it using a reciprocating press.

9. The method according to claim 1, wherein steps c)-f) are repeated at two or more points to determine a powder density profile.

10. A method for forming ceramic tiles comprising the method for forming the compacted powder products according to claim 1.

11. An apparatus for forming compacted powder products, comprising:
   a powder supply system configured to deposit a soft powder mass on a supporting table;
   a compacting station configured to receive the soft powder mass and to compact the soft power mass against the supporting table to obtain a compacted powder product;

an emitter mounted on a first side of the powders and configured to emit an input X-ray beam having a predetermined emission intensity;

an output detector mounted on a second side of the powders, opposite the first side, and configured to detect an output parameter representing an output intensity of the X-ray beam which passes through the powders;

a measuring device configured to measure the thickness of the powders;

a control unit operatively connected to the emitter, the output detector and the measuring device are programmed to determine the density of the powders as a function of the emission intensity, the output intensity, and the thickness and type of the powders; a reference detector mounted on the first side and configured to detect a reference parameter representing the effective intensity of the X-ray beam generated, wherein the control unit operatively connected to the powder supply system and to the reference detector and is programmed to compensate the output parameter by means of the reference parameter and to generate a control signal representing the density detected and to control the powder supply system by means of the control signal.

12. The apparatus according to claim 11, wherein the reference detector is located at a position not screened from the input X-ray beam and offset relative to the output detector.

13. The apparatus according to claim 11, wherein the control unit is programmed to perform compensation by normalizing the output parameter to obtain a compensated parameter given by the ratio between the output parameter and the reference parameter.

14. The apparatus according to claim 11, wherein the control unit is programmed to perform compensation by applying an algorithm which operates as a function of the effective hardness of the input X-ray beam determined as a function of the reference parameter.

15. The apparatus according to claim 11, wherein the emitter positioned in such a way as to operate on the compacted powder product.

16. The apparatus according to claim 11, wherein the powder supply system is configured to operate continuously on a supporting table which is slidable in a feed direction, in such a way as to form a continuous strip of powders and wherein the compacting station comprises a sliding compacting surface to continuously compact the powders as the supporting table advances to obtain the compacted powder product in the form of a continuous belt.

17. The apparatus according to claim 16, wherein the emitter, the output detector and the reference detector are movable in a direction transverse to the feed direction to determine a powder density profile.

18. The apparatus according to claim 11, wherein the compacting station comprises a reciprocating press operating on a quantity of soft powder mass.

19. An apparatus for forming ceramic tiles comprising an apparatus for forming compacted powder products according to claim 11.

* * * * *